(12) United States Patent
Kim et al.

(10) Patent No.: US 12,019,471 B2
(45) Date of Patent: Jun. 25, 2024

(54) WINDOW AND DISPLAY DEVICE INCLUDING SAME

(71) Applicant: Samsung Display Co., Ltd., Yongin-si (KR)

(72) Inventors: Sanghoon Kim, Hwaseong-si (KR); Minsang Koo, Seongnam-si (KR); Kyung-Man Kim, Anyang-si (KR); Seungho Kim, Asan-si (KR); Min-Hoon Choi, Seoul (KR); Seongjin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/966,280

(22) Filed: Oct. 14, 2022

(65) Prior Publication Data

US 2023/0032676 A1 Feb. 2, 2023

Related U.S. Application Data

(63) Continuation of application No. 17/200,327, filed on Mar. 12, 2021, now Pat. No. 11,474,561.

(30) Foreign Application Priority Data

Jul. 8, 2020 (KR) .................. 10-2020-0083923

(51) Int. Cl.
*G06F 1/16* (2006.01)
(52) U.S. Cl.
CPC .......... *G06F 1/1616* (2013.01); *G06F 1/1656* (2013.01)

(58) Field of Classification Search
CPC ..... G06F 1/1616; G06F 1/1652; G06F 1/1656
See application file for complete search history.

(56) References Cited

U.S. PATENT DOCUMENTS

| 8,845,916 | B2 | 9/2014 | Shin |
| 10,364,179 | B2 | 7/2019 | Shin |
| 10,481,423 | B2* | 11/2019 | Song ................ G02F 1/133305 |
| 10,602,631 | B2 | 3/2020 | Song et al. |
| 11,334,117 | B2 | 5/2022 | Youn et al. |
| 11,474,561 | B2* | 10/2022 | Kim ....................... G06F 1/1641 |
| 2020/0009691 | A1 | 1/2020 | Ostholt et al. |

FOREIGN PATENT DOCUMENTS

| KR | 10-2009-0033813 | 4/2009 |
| KR | 10-0969473 | 7/2010 |
| KR | 10-2015-0051459 | 5/2015 |

(Continued)

*Primary Examiner* — Anthony Q Edwards
(74) *Attorney, Agent, or Firm* — KILE PARK REED & HOUTTEMAN PLLC

(57) ABSTRACT

A window includes a first cover layer, a second cover layer, and a first adhesive part. The first cover layer includes a first non-folding area, a folding area, and a second non-folding area that are arranged in a first direction, and a plurality of first recessed portions recessed from a top surface of the folding area and extended in a second direction intersecting the first direction. The second cover layer is disposed on the first cover layer. The first adhesive part is disposed between the first cover layer and the second cover layer, and includes protrusions disposed in the plurality of first recessed portions of the first cover layer.

20 Claims, 9 Drawing Sheets

(56) References Cited

FOREIGN PATENT DOCUMENTS

| KR | 10-2016-0006585 | 1/2016 |
| KR | 10-2017-0023231 | 3/2017 |
| KR | 10-2018-0062195 | 6/2018 |
| KR | 10-2018-0079093 | 7/2018 |
| KR | 10-2019-0116378 | 10/2019 |
| KR | 10-2019-0123428 | 11/2019 |

\* cited by examiner

WINDOW AND DISPLAY DEVICE INCLUDING SAME

CROSS-REFERENCE TO RELATED APPLICATION(S)

This is a continuation application of U.S. patent application Ser. No. 17/200,327, filed Mar. 12, 2021, now U.S. Pat. No. 11,474,561, the disclosure of which is incorporated herein by reference in its entirety. U.S. patent application Ser. No. 17/200,327 claims priority to and benefits of Korean Patent Application No. 10-2020-0083923 under 35 U.S.C. § 119, filed on Jul. 8, 2020 in the Korean Intellectual Property Office (KIPO), the entire contents of which are incorporated herein by reference.

BACKGROUND

(a) Technical Field

The disclosure herein relates to a window and a display device including the same, and, to a window suitable for a flexible display device folded and unfolded about a folding axis; and a display device including the same.

(b) Description of the Related Art

Electronic apparatuses that provide an image to a user, such as smart phones, digital cameras, laptop computers, navigation units, and smart televisions include display devices for displaying the image. Such a display device generates an image and provides the image to the user via a display screen.

Recently, various types of display devices have been developed with the technological advancements regarding the display devices. For example, various flexible display devices, which may be deformable, foldable, or rollable into a curved shape, have been developed. The flexible display devices having diversely deformable shapes may be easy to carry and improve user's convenience.

Among the flexible display devices, a foldable display device may be folded about a folding axis extending in one direction. The foldable display device may include a flexible display panel and a flexible window disposed on the display panel.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a window suitable for a foldable display device and a display device including the window.

An embodiment provides a window that may include a first cover layer comprising a first non-folding area, a folding area, and a second non-folding area that may be arranged in a first direction; and a plurality of first recessed portions recessed from a top surface of the folding area and extended in a second direction intersecting the first direction; a second cover layer disposed on the first cover layer; and a first adhesive part disposed between the first cover layer and the second cover layer, wherein the first adhesive part may comprise protrusions disposed in the plurality of first recessed portions of the first cover layer.

The second cover layer may have a thickness less than a thickness of the first cover layer.

Depths of the plurality of first recessed portions of the first cover layer may vary gradually in a direction from a center of the folding area toward the first non-folding area or the second non-folding area.

Depths of the plurality of first recessed portions of the first cover layer may decrease gradually in the direction from the center of the folding area toward the first non-folding area or the second non-folding area.

Depths of the plurality of first recessed portions of the first cover layer may increase gradually in the direction from the center of the folding area toward the first non-folding area or the second non-folding area.

The first cover layer may include a plurality of second recessed portions recessed from a bottom surface of the folding area and extended in the second direction.

The plurality of first recessed portions and the plurality of second recessed portions may be alternately disposed in the first direction.

The window may further include a plurality of second adhesive parts inserted into the second recessed portions of the first cover layer.

The plurality of first recessed portions may not be formed in the first and second non-folding areas.

The window may further include a third cover layer disposed below the first cover layer, wherein the third cover layer and the second cover layer may comprise a same material.

The plurality of first recessed portions may be spaced apart from each other in the first direction.

Each of the plurality of first recessed portions may be defined by a first inner surface of the first cover layer; a second inner surface facing the first inner surface of the first cover layer; and a bottom surface perpendicular to the first inner surface and the second inner surface of the first cover layer.

A depth of each of the plurality of first recessed portions may be less than a thickness of the first cover layer.

The plurality of first recessed portions may be spaced apart from each other in the first direction or in the second direction.

Each of the plurality of first recessed portions may have a "V" shape or a "U" shape in the second direction.

In an embodiment, a window may include a first cover layer comprising a first non-folding area, a folding area, and a second non-folding area that may be arranged in a first direction; and a plurality of pattern holes passing through a top surface of the folding area and extended in a second direction intersecting the first direction; a second cover layer disposed on the first cover layer; and a first adhesive part disposed between the first cover layer and the second cover layer, wherein the first adhesive part may comprise protrusions disposed in the plurality of pattern holes.

The window may further include a second adhesive layer extended from the plurality of protrusions and disposed below the first cover layer.

The window may further include a third cover layer disposed below the first cover layer, wherein the third cover layer and the second cover layer may comprise a same material.

The plurality of pattern holes may be spaced apart from each other in the first direction.

In an embodiment, a display device may include a display module comprising a folding area foldable with respect to a folding axis extending in one direction; and a window disposed on the display module, the window and the display module being folded together, wherein the window may include a first cover layer comprising a plurality of recessed portions, each of the plurality of recessed portions being included in a top surface of the first cover layer overlapping the folding area, and each of the plurality of recessed portions extending in the one direction; an adhesive part disposed on the first cover layer and comprising protrusions disposed in the plurality of recessed portions in a bottom surface of the adhesive part; and a second cover layer disposed on the adhesive part.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1:
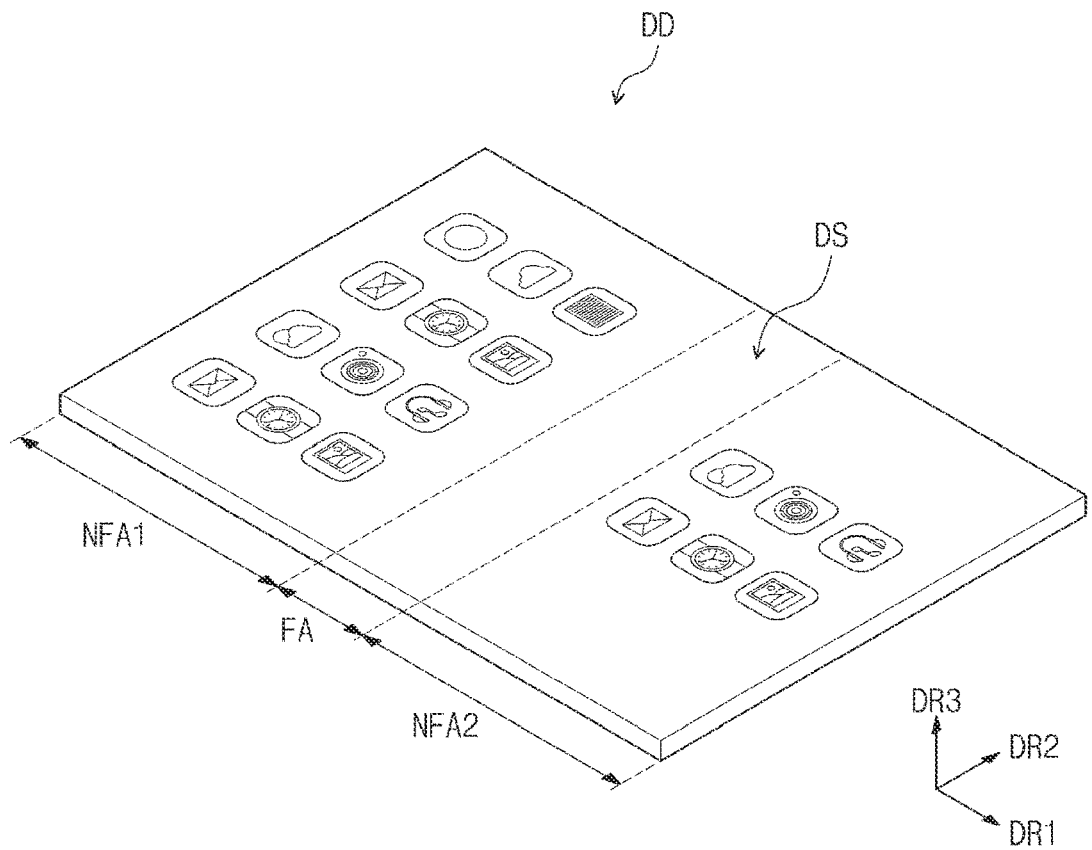
FIG. 1 is a perspective view illustratively showing a display device according to an embodiment.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

Like numbers refer to like elements throughout. Also, in the drawings, the thicknesses, ratios, and dimensions of the elements may be exaggerated for effective description of the technical contents and for clarity.

The term "and/or" includes any and all combinations of one or more of the associated listed items.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the scope of the disclosure. The singular forms include the plural forms unless the context clearly indicates otherwise.

Also, terms such as "below", "lower", "above", and "upper" may be used to describe the relationships of the components illustrated in the drawings. These terms have a relative concept, and are described on the basis of the directions indicated in the drawings, but are not limited thereto.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that the term "includes" or "comprises" or "has" or "having" and the variations thereof, when used in this specification, specify the presence of stated features, integers, steps, operations, elements, components, or a combination thereof, but do not preclude the presence or addition of one or more other features, integers, steps, operations, elements, components, or combinations thereof.

Hereinafter, embodiments will be described in detail with reference to the accompanying drawings.

Figure 2:
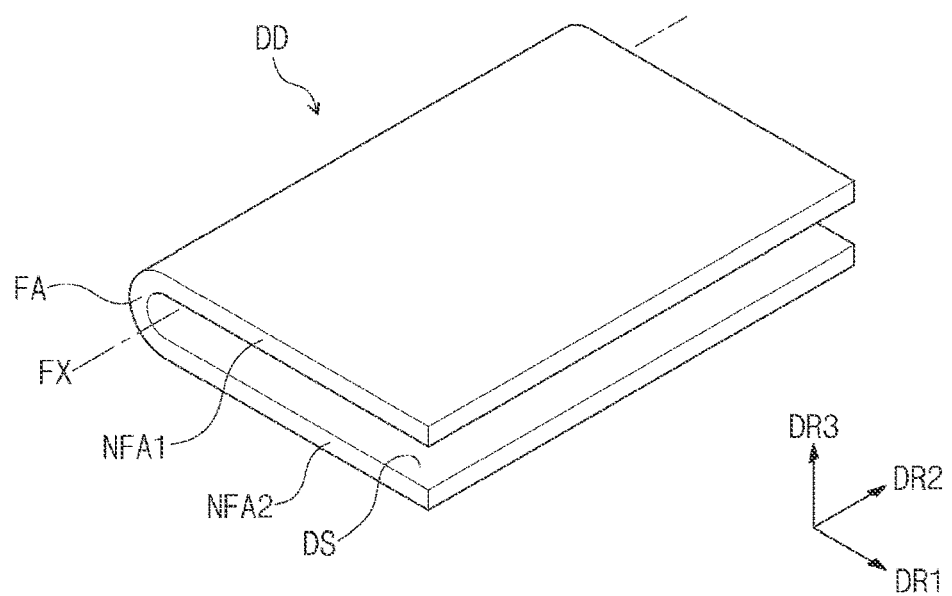
FIG. 2 is a perspective view illustratively showing a state in which the display device illustrated in FIG. 1 is folded.

FIG. 1 is a perspective view illustratively showing a display device according to an embodiment. FIG. 2 is a perspective view illustratively showing a state in which the display device illustrated in FIG. 1 is folded.

Referring to FIG. 1, a display device DD according to an embodiment may display an image. The display device DD may provide a user with an image or images through a display surface DS.

According to an embodiment, the display device DD may have two sides extending in a first direction DR1 and two sides extending in a second direction DR2 crossing or intersecting the first direction DR1. When viewed in a plan view, the display device DD may have a substantially rectangular shape. In this specification, the meaning of "when viewed in a plan" may represent a state when viewed in a third direction DR3 perpendicular to the plane defined by the first direction DR1 and the second direction DR2.

According to an embodiment, the display device DD may be a flexible display device. For example, the display device DD may be folded and unfolded. By way of example, the display device DD may include a first non-folding area NFA1, a folding area FA, and a second non-folding area NFA2, which may be arranged or disposed in the first direction DR1. The folding area FA may be disposed between the first non-folding area NFA1 and the second non-folding area NFA2.

FIG. 1 illustratively shows one or a folding area FA and two non-folding areas NFA1 and NFA2, but the numbers of the folding area FA and the non-folding areas NFA1 and NFA2 are not limited thereto. The display device DD may include more than two, for example, a plurality of non-folding areas and a plurality of folding areas disposed between the non-folding areas.

Referring to FIG. 2, the display device DD may be folded about a folding axis FX. The folding axis FX may be parallel to the second direction DR2. Here, the first non-folding area NFA1 and the second non-folding area NFA2 of the display device DD may face each other. Accordingly, the display surface DS of the display device DD may not be exposed to the outside. For example, the display device DD may be in-folded.

However, the folding shape of the display device DD is not limited to that described above. For example, the display device DD may be folded about a folding axis parallel to the first direction DR1. Alternatively, the display device DD may be out-folded so that the display surface DS may be exposed to the outside.

Figure 3:
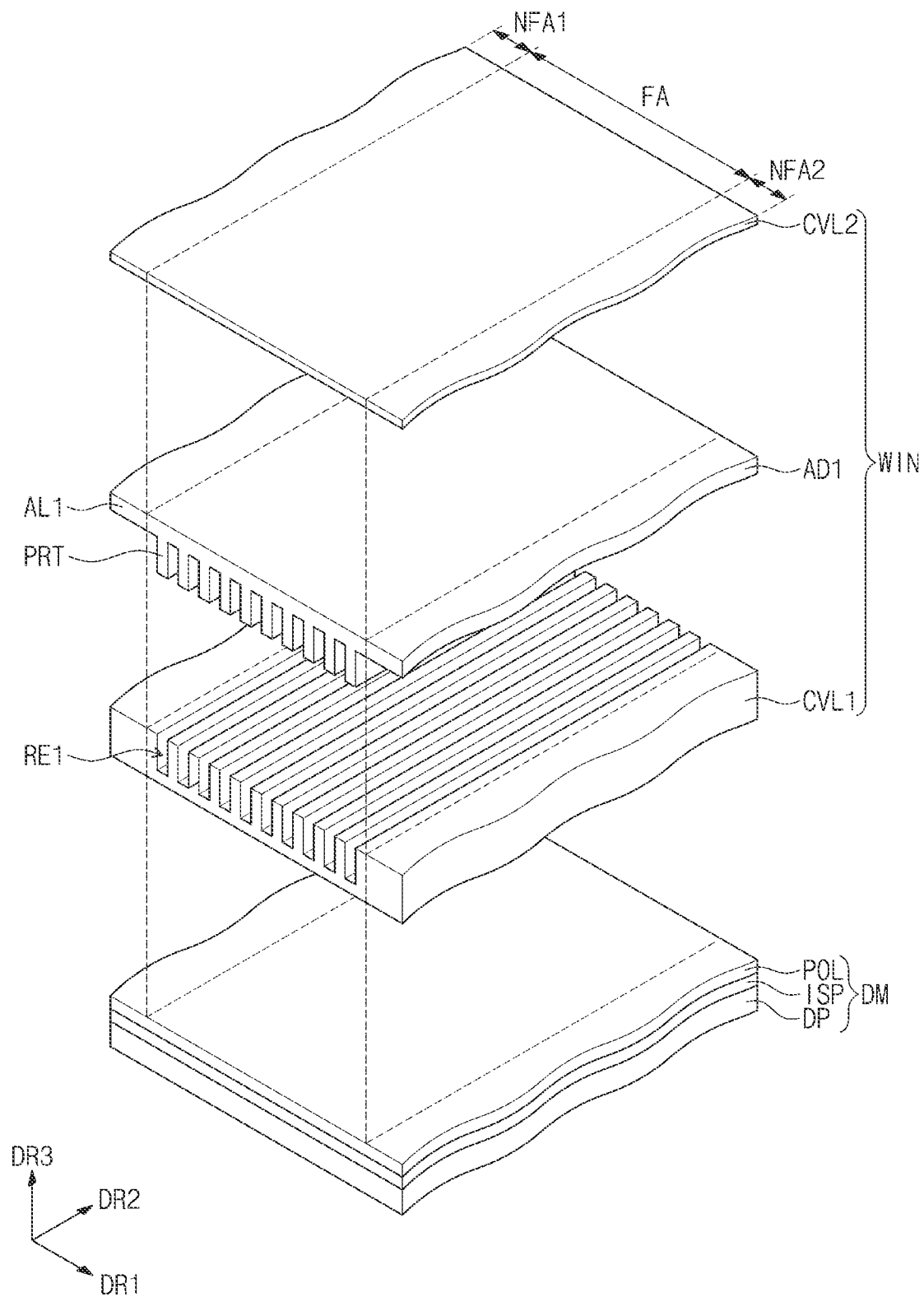
FIG. 3 is an exploded perspective view illustratively showing the display device illustrated in FIG. 1.
Figure 4:
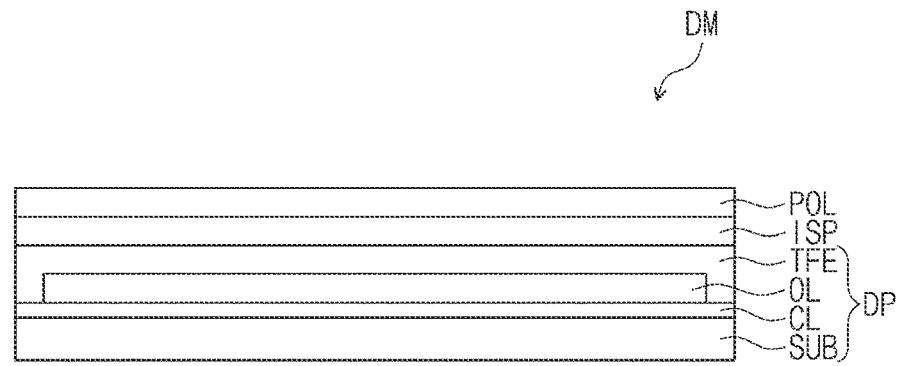
FIG. 4 is a schematic cross-sectional view illustratively showing the display module illustrated in FIG. 3.
Figure 4:
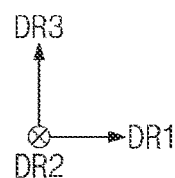

FIG. 3 is an exploded perspective view illustratively showing the display device illustrated in FIG. 1. FIG. 4 is a schematic cross-sectional view illustratively showing the display module illustrated in FIG. 3.

Referring to FIGS. 3 and 4, the display device DD may include a display module DM and a window WIN disposed on the display module DM.

The display module DM may display an image or images and sense an input of a user. The display module DM may be a flexible display module. For example, the display module DM may be folded about the folding axis FX as illustrated in FIG. 2.

The display module DM may include a display panel DP, an input sensing part ISP disposed on the display panel DP, and an anti-reflection layer POL disposed on the input sensing part ISP.

According to an embodiment, the display panel DP may be an organic light emitting display panel. By way of example, the display panel DP may include a substrate SUB, a circuit element layer CL disposed on the substrate SUB, a display element layer OL disposed on the circuit element layer CL, and a thin film encapsulation layer TFE disposed on the display element layer OL.

The substrate SUB may be a flexible substrate. For example, the substrate SUB may include polyimide (PI). However, the material of the substrate SUB is not limited thereto.

The circuit element layer CL may include an insulating layer, a semiconductor pattern, and a conductive pattern, a signal line, and the like within the spirit and the scope of the disclosure. The insulating layer, the semiconductor layer, and the conductive layer may be formed or disposed on the substrate SUB through coating and deposition methods, and subsequently, the insulating layer, the semiconductor layer, and the conductive layer may be selectively patterned through photolithography processes performed multiple times. Subsequently, the semiconductor pattern, the conductive pattern, and the signal line of the circuit element layer CL may be formed.

The display element layer OL may be disposed on the circuit element layer CL. The display element layer OL may include a light emitting element. For example, the display element layer OL may include an organic light emitting material, a quantum dot, a quantum rod, or micro LED.

The thin film encapsulation layer TFE may be disposed on the circuit element layer CL to cover or overlap the display element layer OL. The thin film encapsulation layer TFE may include an inorganic layer, an organic layer, and an inorganic layer which may be sequentially stacked. The inorganic layer may include an inorganic material and protect pixels from moisture/oxygen. The organic layer may include an organic material and protect pixels from impurities such as dust particles.

In the preceding description, the display panel DP is assumed to be an organic light emitting display panel, but an embodiment is not limited thereto. For example, the display device DP may be a liquid crystal display device.

The input sensing part ISP may include a plurality of sensors for sensing an external input. The sensors may sense the external input in a capacitive method. The external input may include various types of inputs such as a portion of the user's body, light, heat, a pen, or pressure.

The anti-reflection layer POL may be disposed on the input sensing part ISP. The anti-reflection layer POL may be a film for preventing external light from being reflected. The anti-reflection layer POL may reduce the reflectivity of external light which may be incident toward the display panel DP from above the display device DD. For example, the anti-reflection layer POL may include a phase retarder and/or a polarizer.

According to an embodiment, the display device DM may include a plurality of adhesive members. For example, layers of the display module DM may be connected to each other by an adhesive member disposed between neighboring layers.

Figure 5:
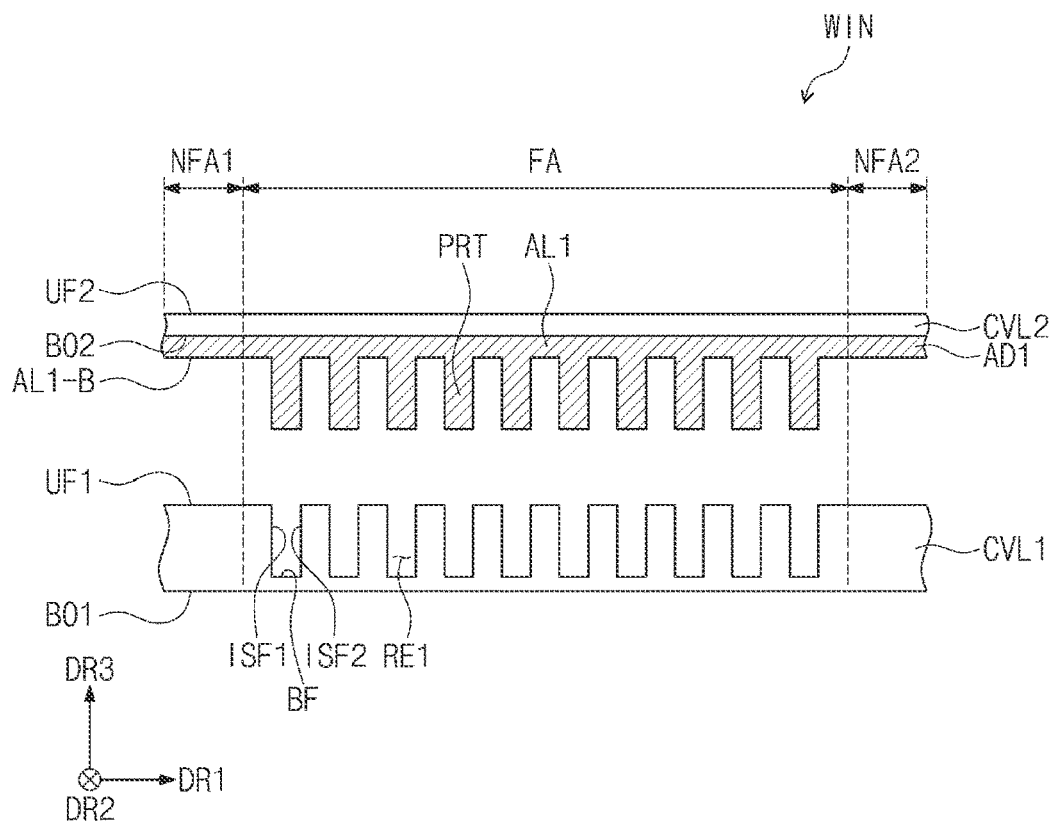
FIG. 5 is a schematic cross-sectional view illustratively showing the window illustrated in FIG. 3.

FIG. 5 is a schematic cross-sectional view illustratively showing the window illustrated in FIG. 3. For convenience of description, a first cover layer CVL1, a first adhesive part AD1, and a second cover layer CVL2 are illustrated as being separated from each other in FIG. 5.

The window WIN may be disposed on the display module DM to protect the display module DM from external scratches, and folded and unfolded together with the display module DM. Thus, the window WIN used in the flexible display device may be required to have high impact resistance to protect the display module DM and high flexibility to achieve easy folding.

The window WIN according to an embodiment may include a plurality of cover layers to ensure high impact resistance and also have a pattern in a folding portion to ensure high flexibility. Hereinafter, the window WIN according to an embodiment will be described in more detail.

Referring to FIGS. 3, and 5, the window WIN may include a first cover layer CVL1, a second cover layer CVL2, and a first adhesive part AD1. The first cover layer CVL1 may be disposed on the display module DM. The first adhesive layer CVL1 may have optically transparent characteristics. For example, the first cover layer CVL1 may include materials such as transparent glass, polymethylmethacrylate (PMMA), and polycarbonate PC. However, the material of the first cover layer CVL1 is not limited to those described above.

The first cover layer CVL1 may include a first non-folding area NFA1, a folding area FA, and a second non-folding area NFA2. Substantially, the first non-folding area NFA1, the folding area FA, and the second non-folding area NFA2 may be defined or formed in each of the layers of the display device DD (see FIG. 1).

A first recess RE1 may be defined or formed in the first cover layer CVL1. The first recess RE1 may be defined or formed in a first top surface UF1 of the folding area FA. The first recess RE1 may be recessed downward (for example, in a third direction DR3) from the first top surface UF1. The first recess RE1 may not be defined or formed in the non-folding areas NFA1 and NFA2.

In an embodiment, the first recess RE1 may be provided in plurality. Each of the first recessed portions RE1 may extend in a second direction DR2. Each of the first recessed portions RE1 may be parallel to the folding axis FX illustrated in FIG. 2. The first recessed portions RE1 may be arranged or disposed spaced apart from each other in a first direction DR1. In the third direction DR3, the depth of each of the first recessed portions RE1 may be less than the thickness of the first cover layer CVL1.

FIG. 5 illustrates that ten of the first recessed portions RE1 may be defined or formed in the first top surface UF1 of the folding area FA. However, this is merely an example, and an embodiment is not limited thereto. The number of first recessed portions RE1 defined or formed in the folding area FA may change.

As a further example, each of the first recessed portions RE1 may be defined or formed by a first inner surface ISF1, a second inner surface ISF2, and a bottom surface BF in the first cover layer CVL1. Each of the first inner surface ISF1 and the second inner surface ISF2 may be parallel to the plane defined by the second direction DR2 and the third direction DR3. The first inner surface ISF1 and the second inner surface ISF2 may face each other.

The bottom surface BF may be disposed between one or an end of the first inner surface ISF1 and one or an end of the second inner surface ISF2. The bottom surface BF may be parallel to the first top surface UF1 of the first cover layer CVL1. In an embodiment, the bottom surface BF may be perpendicular to the first inner surface ISF1 and the second inner surface ISF2. Accordingly, the first recess RE1 may have a substantially U-shape. However, the shape of the first recess RE1 is not limited thereto.

The second cover layer CVL2 may be disposed above the first cover layer CVL1. A second top surface UF2 of the second cover layer CVL2 may be parallel to the plane defined by the first direction DR1 and the second direction DR2. As an example, the second top surface UF2 may define or formed the display surface DS illustrated in FIG. 1.

The second cover layer CVL2 may be a chemically reinforced glass substrate. For example, the second cover layer CVL2 may be ultra thin glass (UTG). The second cover layer CVL2 may be chemically reinforced and thus may have high mechanical strength while having high flexibility.

The thickness of the second cover layer CVL2 may be less than the thickness of the first cover layer CVL1 in the third direction DR3. For example, the thickness of the second cover layer CVL2 may be less than about 100 and the thickness of the first cover layer CVL1 may be greater than about 100 However, the thickness of each of the first cover layer CVL1 and the second cover layer CVL2 may be varied depending on the size and shape of the display device DD, the radius of curvature of a bent portion, or the like within the spirit and the scope of the disclosure.

According to an embodiment, the first adhesive part AD1 may be disposed between the first cover layer CVL1 and the second cover layer CVL2. The first cover layer CVL1 may be attached to the second cover layer CVL2 by the first adhesive part AD1.

The first adhesive part AD1 may include an optically transparent material. For example, the first adhesive part AD1 may include an adhesive or filler. In an embodiment, the first adhesive part AD1 may include a transparent polymer resin, an optical clear adhesive (OCA), a pressure sensitive adhesive (PSA), or the like within the spirit and the scope of the disclosure. However, the material of the first adhesive part AD1 is not limited thereto.

The first adhesive part AD1 may include a first adhesive layer AL1 and a plurality of protrusions PRT. The first adhesive layer AL1 may be in contact with the first top surface UF1 of the first cover layer CVL1 and a second bottom surface BO2 of the second cover layer CVL2. The first cover layer CVL1 may include a first bottom surface BO1 that may be substantially parallel to the second bottom surface BO2 of the second cover layer CVL2.

The protrusions PRT may extend downward (for example, in the third direction DR3) from a bottom surface AL1-B of the first adhesive layer AL1. When viewed in a plan view, the protrusions PRT may overlap the folding area FA. The protrusions PRT may be disposed in the corresponding first recessed portions RE1.

Each of the protrusions PRT may have a shape substantially corresponding to the first recess RE1. For example, in an embodiment, each of the protrusions PRT may have a substantially bar shape extending in the second direction DR2. The protrusions PRT may be spaced apart from each other in the first direction DR1.

The thickness of each of the protrusions PRT may be the same as or about the same as the depth of the first recess RE1 in the third direction DR3. Accordingly, each of the protrusions PRT may be in contact with the first inner surface ISF1, the second inner surface ISF2, and the bottom surface BF in a corresponding portion of the first cover layer CVL1.

However, the shape of the protrusions PRT is not limited to that described above. For example, the shape of the protrusions PRT may be varied depending on the shape of the corresponding first recess RE1.

According to an embodiment, since the window WIN may include the plurality of cover layers CVL1 and CVL2, forces applied from the outside of the display device DD may be evenly distributed to the layers. Thus, the display module DM may be more stably protected.

Also, according to an embodiment, the plurality of first recessed portions RE1 extending parallel to the folding axis FX (see FIG. 2) may be defined or formed in the folding area FA of the first cover layer CVL1, and thus, the window WIN may have a high flexibility. Accordingly, the display device DD may be easily folded and unfolded.

According to an embodiment, optically transparent materials may be disposed in the first recessed portions RE1 of the first cover layer CVL1, and thus, the first recess RE1 may be prevented from being viewed from the outside of the display device DD. Also, the impact resistance of the window WIN may be further enhanced by the materials disposed in the first recess RE1.

Hereinafter, a window having a structure different from that in an above embodiment will be described. In the following drawings, the same components as those of an aforementioned embodiment are illustrated by the same reference symbols. Hereinafter, descriptions of the same components as those of the aforementioned embodiment will be omitted, and differences will be mainly described in detail.

Figure 6:
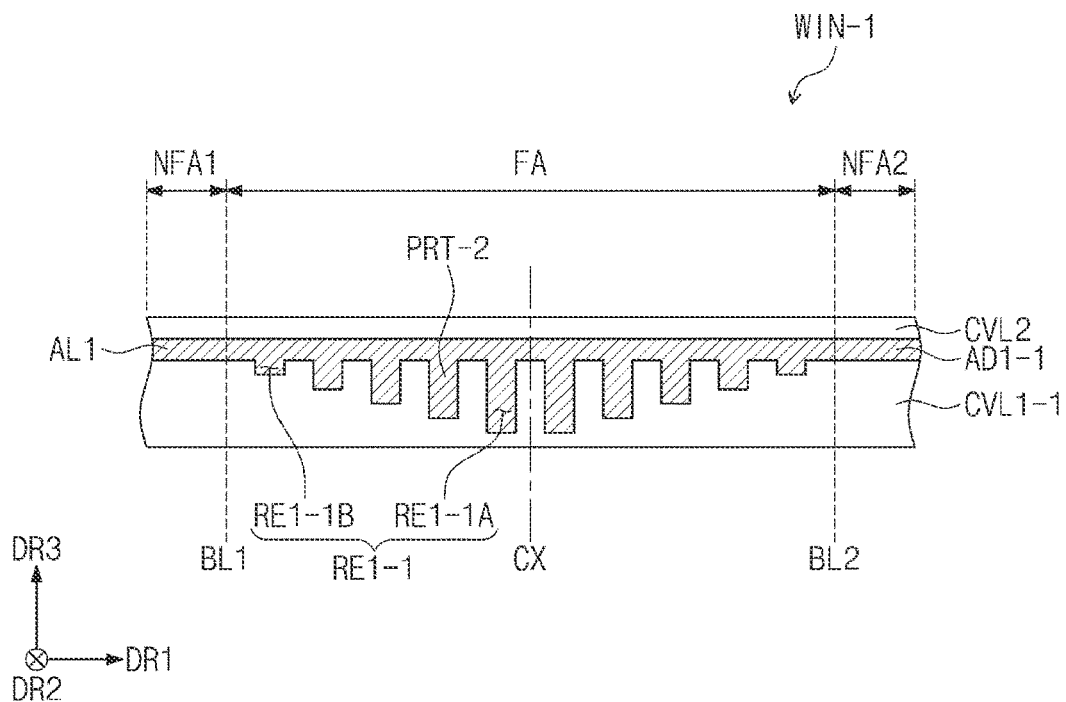
FIGS. 6 and 7 are views illustratively showing windows according to an embodiment.
Figure 7:
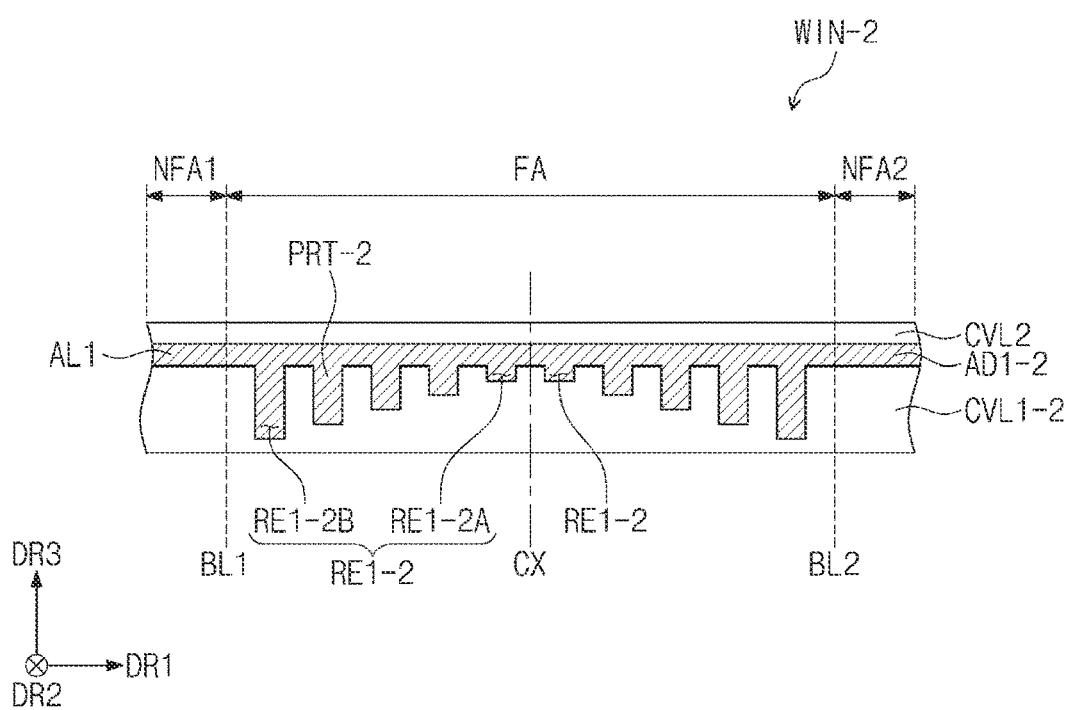

FIGS. 6 and 7 are views illustratively showing windows according to an embodiment. In FIGS. 6 and 7, a central axis CX may be a virtual line that defines the center of a folding area FA in a first direction DR1. In FIGS. 6 and 7, a first boundary line BL1 may be a virtual line that defines a boundary between the folding area FA and a first non-folding area NFA1 in the first direction DR1. In FIGS. 6 and 7, a second boundary line BL2 may be a virtual line that defines a boundary between the folding area FA and a second non-folding area NFA2 in the first direction DR1.

According to an embodiment, the depths of first recessed portions RE1-1 and RE1-2, which may be defined or formed in first cover layers CVL1-1 and CVL1-2 of windows WIN-1 and WIN-2, respectively, may vary gradually in a direction from the central axis CX toward the first boundary line BL1 or the second boundary line BL2.

Referring to FIG. 6, the depths of the first recessed portions RE1-1 may decrease gradually in the direction from the central axis CX toward the first boundary line BL1. The depth of a first recess RE1-1A closest to the central axis CX may be greater than the depth of a first recess RE1-1B closest to the first boundary line BL1. Similarly, the depths of the first recessed portions RE1-1 may decrease gradually in the direction from the central axis CX toward the second boundary line BL2. In FIG. 6, a first adhesive layer or part AL1-1 may be in contact with the first top surface of the first cover layer CVL1-1 and a bottom surface of the second cover layer CVL2.

According to an embodiment, the thicknesses of protrusions PRT-2 disposed in the first recessed portions RE1-1 may decrease in a direction from the central axis CX toward the first boundary line BL1 or the second boundary line BL2.

Referring to FIG. 7, the depths of the first recessed portions RE1-2 may increase gradually in the direction from the central axis CX toward the first boundary line BL1. The depth of a first recess RE1-2A closest to the central axis CX may be less than the depth of a first recess RE1-2B closest to the first boundary line BL1. Similarly, the depths of the first recessed portions RE1-2 may increase gradually in the direction from the central axis CX toward the second boundary line BL2. In FIG. 7, a first adhesive layer or part AL1-2 may be in contact with the first top surface of the first cover layer CVL1-2 and a bottom surface of the second cover layer CVL2.

According to an embodiment, the thicknesses of protrusions PRT-2 disposed in the first recessed portions RE1-2 may increase in a direction from the central axis CX toward the first boundary line BL1 or the second boundary line BL2.

Figure 8:
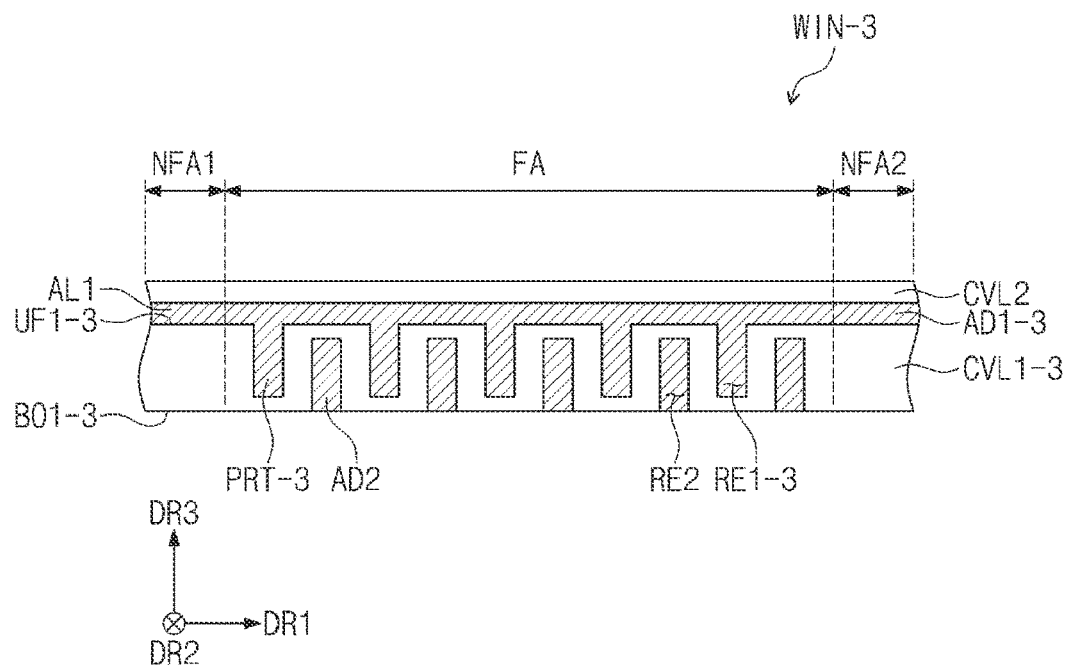
FIG. 8 is a view illustratively showing a window according to an embodiment.

FIG. 8 is a view illustratively showing a window according to an embodiment.

Referring to FIG. 8, a plurality of first recessed portions RE1-3 and second recessed portions RE2 may be defined or formed in a first cover layer CVL1-3 of a window WIN-3. The first recessed portions RE1-3 and the second recessed portions RE2 may be defined or formed only in a folding area FA and may not be defined or formed in first and second non-folding areas NFA1 and NFA2.

The first recess RE1-3 may be defined or formed in a first top surface UF1-3 of the folding area FA. For example, the first recessed portions RE1-3 may extend downward (for example, in a third direction DR3) from the first top surface UF1-3. The second recessed portions RE2 may be defined or formed in a first bottom surface BO1-3 of the folding area FA. For example, the second recessed portions RE2 may extend upward (for example, in a third direction DR3) from the first bottom surface BO1-3.

The second recessed portions RE2 may extend in a second direction DR2. For example, the second recessed portions RE2 may extend in a direction parallel to the folding axis FX illustrated in FIG. 2.

In a first direction DR1, the first recessed portions RE1-3 and the second recessed portions RE2 may be alternately arranged or disposed. In the first direction DR1, a second recess RE2 may be disposed between neighboring or adjacent first recessed portions RE1-3. A first recess RE1-3 and a second recess RE2, which may be adjacent to each other in the first direction DR1, may be spaced apart from each other.

A protrusion PRT-3 of a first adhesive part AD1-3 may be disposed in the first recess RE1-3. A second adhesive part AD2 may be disposed in each of the second recessed portions RE2. The second adhesive part AD2 may include the same or similar material as the first adhesive part AD1-3. For example, the second adhesive part AD2 may include an optically transparent adhesive or filler.

According to an embodiment, an adhesive layer extending from the plurality of second adhesive parts AD2 and a third adhesive layer disposed below the adhesive layer may be further provided or disposed below the first cover layer CVL1-3. The third cover layer may be attached to the first cover layer CVL1-3 by the adhesive layer. For example, the third cover layer may be the same ultra thin glass (UTG) as a second cover layer CVL2.

According to an embodiment, the first recessed portions RE1-3 and the second recessed portions RE2 may be defined or formed in the first top surface UF1-3 and the first bottom surface BO1-3 of the first cover layer CVL1-3, respectively, and the first recessed portions RE1-3 and the second recessed portions RE2 may be alternately arranged or disposed in a first direction DR1. Thus, the flexibility of the window WIN may be further enhanced.

Figure 9:
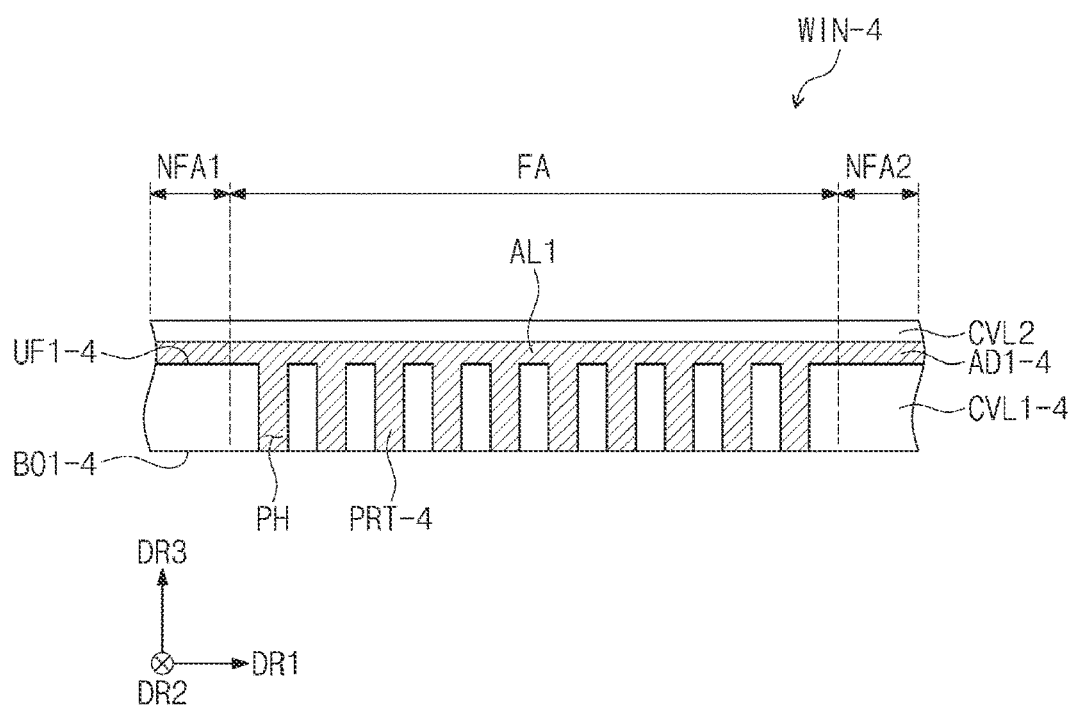
FIG. 9 is a schematic cross-sectional view illustratively showing a window according to an embodiment.

FIG. 9 is a schematic cross-sectional view illustratively showing a window according to an embodiment.

Referring to FIG. 9, a window WIN-4 may include a first cover layer CVL1-4, a second cover layer CVL2, and a first adhesive layer AD1-4. In a third direction DR3, the first adhesive layer AD1-4 may be disposed between the first cover layer CVL1-4 and the second cover layer CVL2.

The first cover layer CVL1-4 may include a first non-folding area NFA1, a folding area FA, and a second non-folding area NFA2, which may be arranged or disposed in a first direction DR1. A pattern hole PH may be defined or formed in a first top surface UF1-4 of the folding area FA. The pattern hole PH may pass through the folding area FA in a thickness direction (for example, the third direction DR3). The pattern hole PH may not be defined or formed in the non-folding areas NFA1 and NFA2.

According to an embodiment, the pattern hole PH may be provided in plurality. The pattern holes PH may extend in a second direction DR2. For example, each of the pattern holes PH may extend parallel to the folding axis FX illustrated in FIG. 2.

The pattern holes PH may be arranged or disposed spaced apart from each other in the first direction DR1. In the third direction DR3, the pattern holes PH may extend from the first top surface UF1-4 of the first cover layer CVL1-4 to a first bottom surface BO1-4.

The first adhesive part AD1-4 may include an optically transparent material. For example, the first adhesive part AD1-4 may include an adhesive or filler. In an embodiment, the first adhesive part AD1-4 may include transparent materials such as a transparent polymer resin, an optical clear adhesive (OCA), and a pressure sensitive adhesive (PSA). However, the material of the first adhesive part AD1-4 is not limited thereto.

Protrusions PRT-4 of the first adhesive part AD1-4 may be disposed in the pattern holes PH. The bottom surface of the protrusions PRT-4 may be parallel to the first bottom surface BO1-4 of the first cover layer CVL1-4.

Figure 10:
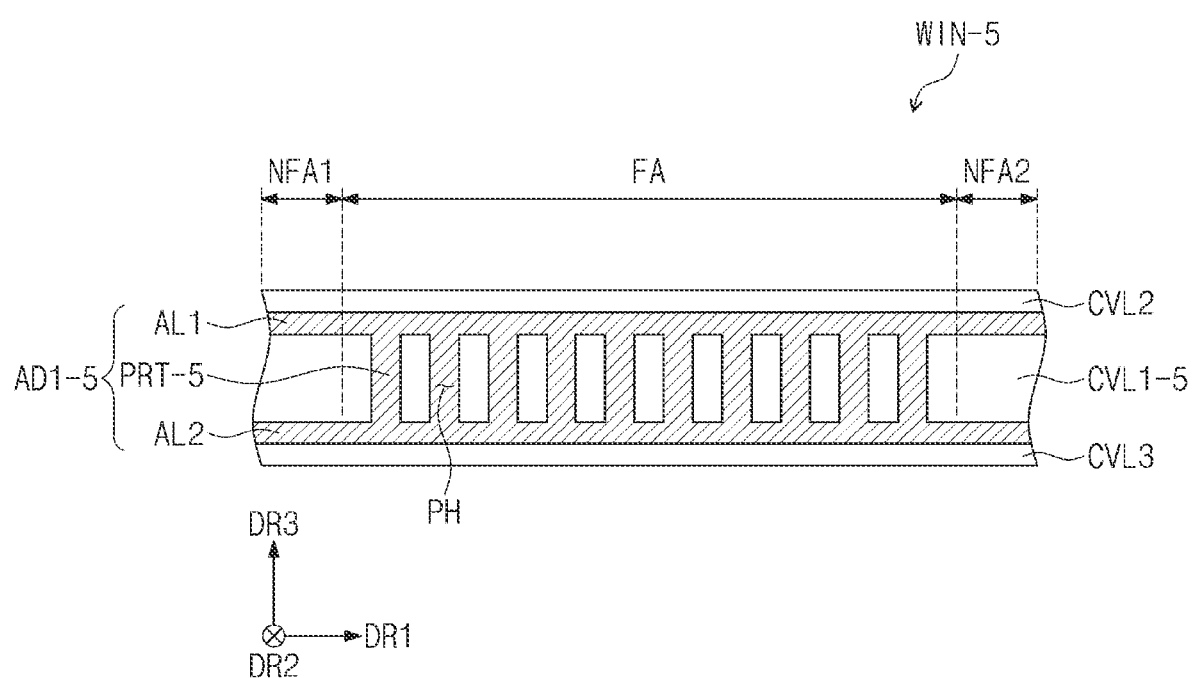
FIG. 10 is a schematic cross-sectional view illustratively showing a window according to an embodiment.

FIG. 10 is a schematic cross-sectional view illustratively showing a window according to an embodiment.

Referring to FIG. 10, a first adhesive part AD1-5 may further include a second adhesive layer AL2. The second adhesive layer AL2 may be disposed below a first cover layer CVL1-5.

The second adhesive layer AL2 may extend from protrusions PRT-5. The second adhesive layer AL2 may be integrated or formed integrally with the first adhesive layer AL1 and the protrusions PRT-5. The second adhesive layer AL2 may include the same or similar material as the first adhesive layer AL1 and the protrusions PRT-5. For example, the second adhesive layer AL2 may include an optically transparent adhesive or filler.

According to an embodiment, a window WIN-5 may further include a third cover layer CVL3. The third cover layer CVL3 may be disposed below the second adhesive layer AL2. The third cover layer CVL3 may be fixed to the first cover layer CVL1-5 by the second adhesive layer AD2.

The third cover layer CVL3 may include the same or similar material as the second cover layer CVL2. The third cover layer CVL3 may be a chemically reinforced glass substrate. For example, the third cover layer CVL3 may be ultra thin glass (UTG). Similar to the second cover layer CVL2, the third cover layer CVL3 may be chemically reinforced and thus may have high mechanical strength while having high flexibility.

According to an embodiment, the window WIN-5 may further include the third cover layer CVL3, and thus, the impact resistance of the window WIN-5 may be further enhanced.

Figure 11A:
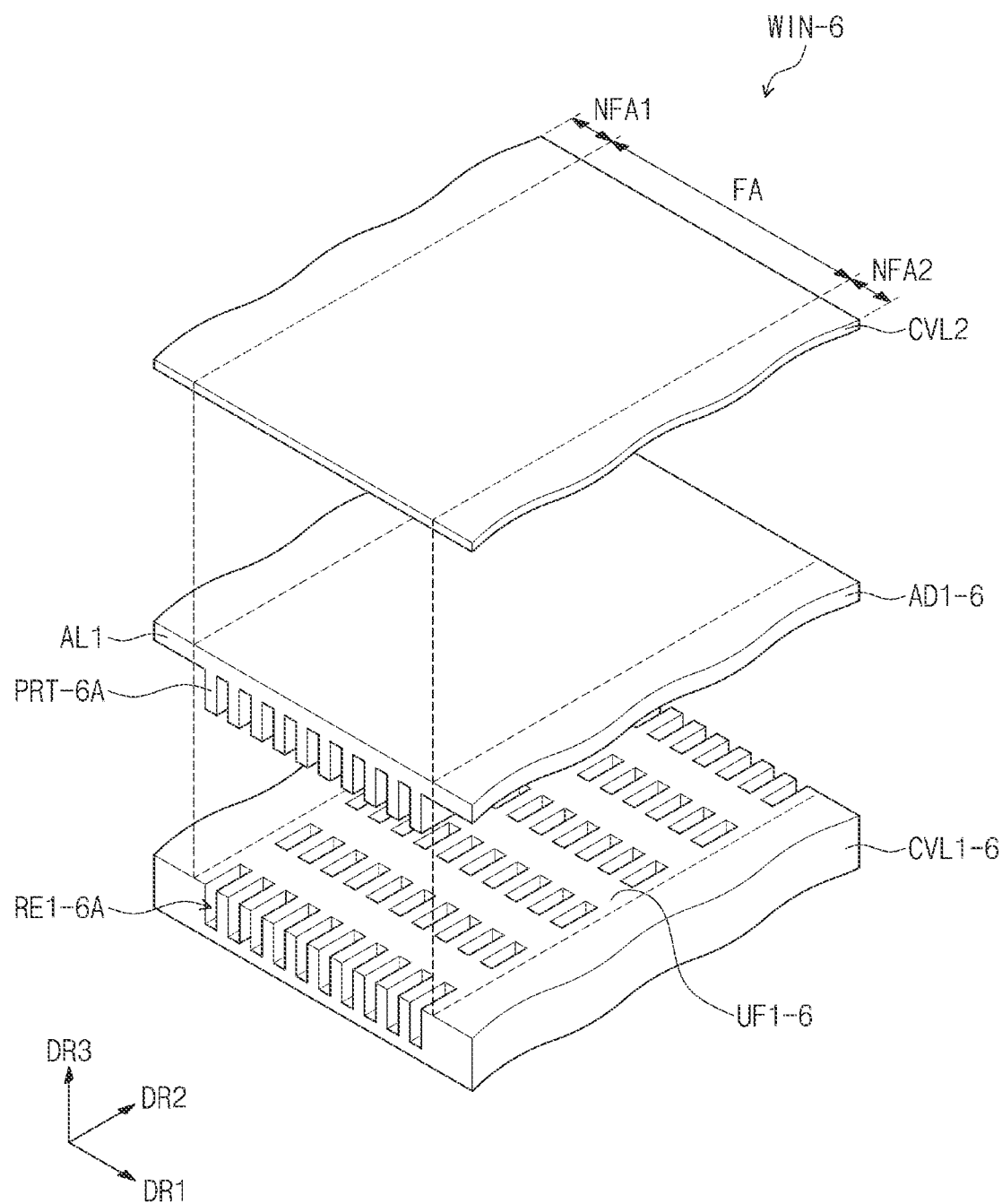
FIGS. 11A and 11B are perspective views illustratively showing windows according to an embodiment.
Figure 11B:
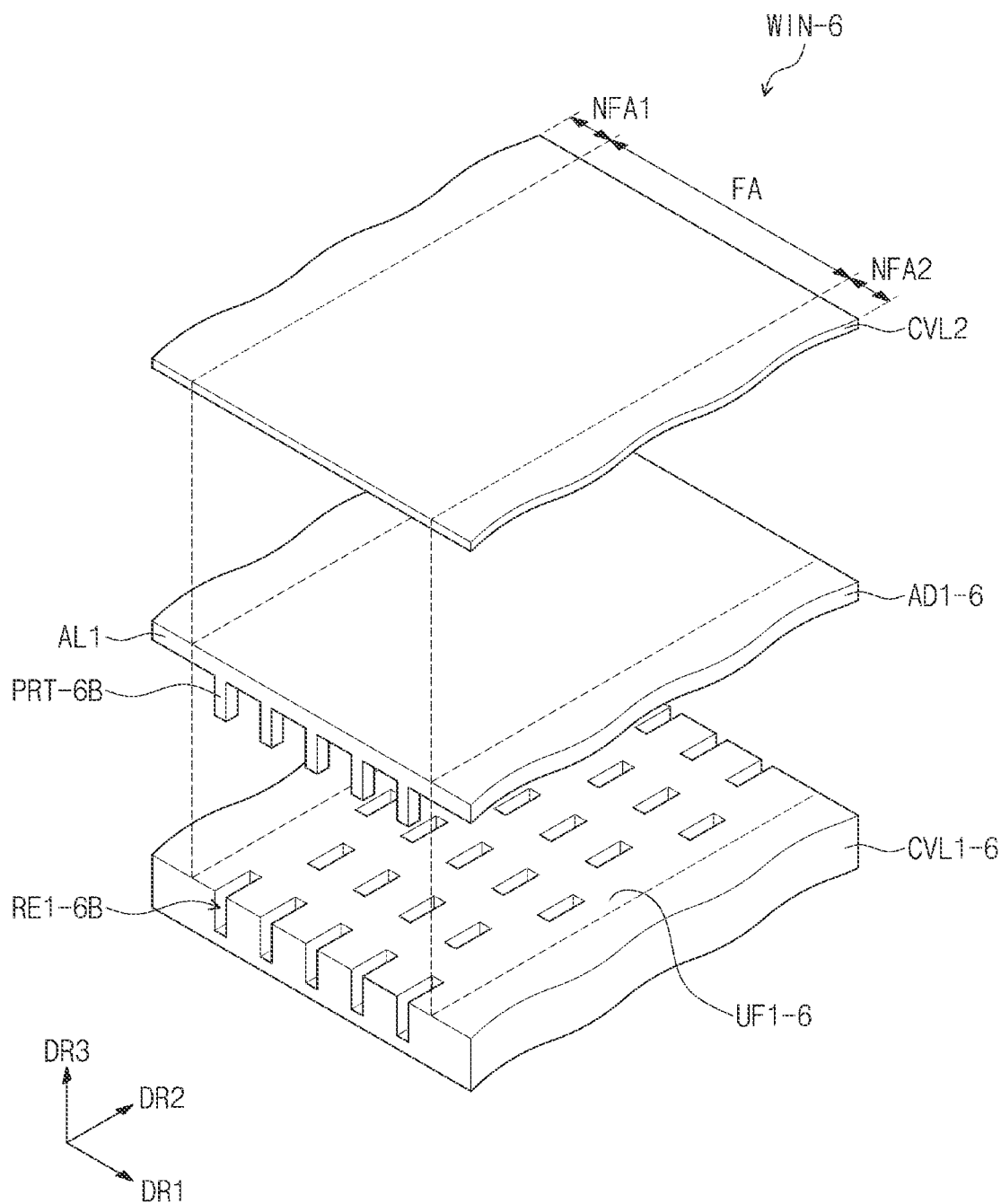

FIGS. 11A and 11B are perspective views illustratively showing windows according to an embodiment.

Referring to FIGS. 11A and 11B, a plurality of first recessed portions RE1-6A and RE1-6B may be defined or formed in a first cover layer CVL1-6 of a window WIN-6. The first recessed portions RE1-6A and RE1-6B may be defined or formed in a folding area FA and may not be defined or formed in non-folding areas NFA1 and NFA2. The first recessed portions RE1-6A and RE1-6B may be recessed downward (for example, in a third direction DR3) from a first top surface UF1-6 of the folding area FA. In FIGS. 11A and 11B, a first adhesive layer or part AL1-6 may be in contact with the first top surface of the first cover layer CVL1-6 and a bottom surface of the second cover layer CVL2.

For example, as illustrated in FIG. 11A, the first recessed portions RE1-6A may be regularly arranged or disposed in a first direction DR1 and a second direction DR2. Neighboring or adjacent first recessed portions RE1-6A may be spaced apart from each other in the first direction DR1 and the second direction DR2.

When viewed in a plan view, the first recessed portions RE1-6A may have a substantially quadrangular shape. However, the shape of the first recessed portions RE1-6A is not limited thereto. For example, when viewed in a plan view, the shape of the first recessed portions RE1-6A may be modified into a substantially circular shape, a substantially polygonal shape, or the like within the spirit and the scope of the disclosure.

Protrusions PRT-6A may be disposed in the first recessed portions RE1-6A. For example, each of the protrusions PRT-6A may have a shape substantially corresponding to each of the first recessed portions RE1-6A. The protrusions PRT-6A may be arranged or disposed in the first direction DR1 and the second direction DR2, and the protrusions PRT-6A may be spaced apart from each other in the first direction DR1 and the second direction DR2.

As another example, the first recessed portions RE1-6B may be irregularly arranged or disposed as illustrated in FIG. 11B. Neighboring or adjacent first recessed portions RE1-6B may be arranged or disposed in a zigzag pattern in a second direction DR2. Protrusions PRT-6B may be arranged or disposed in a pattern corresponding to that of the first recessed portions RE1-6B.

In the window WIN-6 according to an embodiment, portions of the first cover layer CVL1-6 may be disposed between the first recessed portions RE1-6A and RE1-6B adjacent to each other in the second direction DR2, and thus, the durability of the window WIN-6 may be further enhanced than that of the window WIN according to the aforementioned embodiment.

Figure 12:
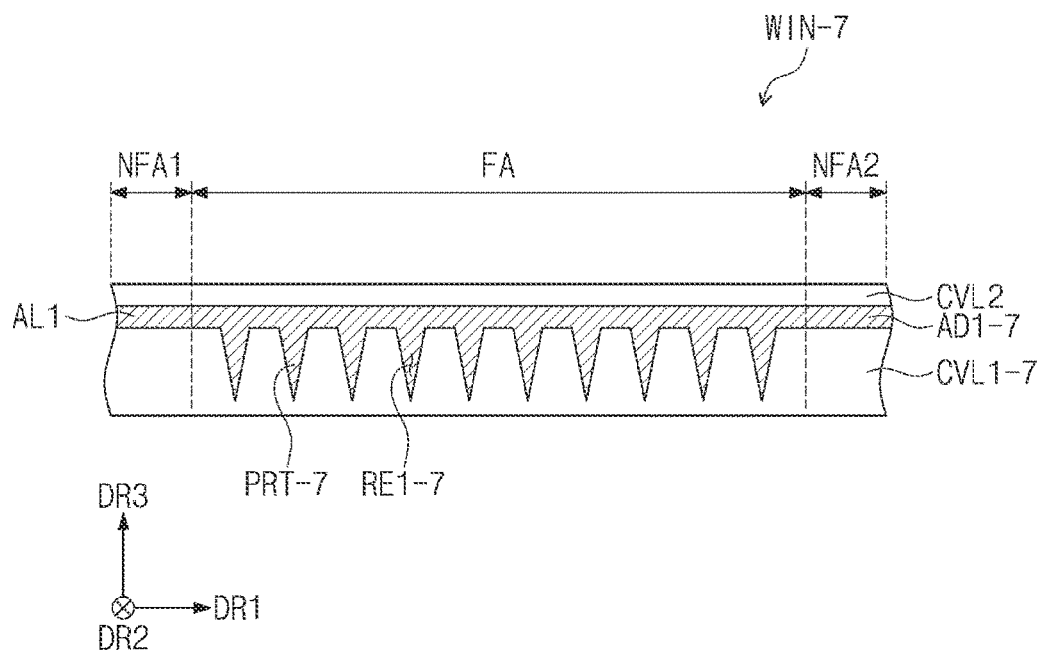
FIGS. 12 and 13 are schematic cross-sectional views illustratively showing windows according to an embodiment.
Figure 13:
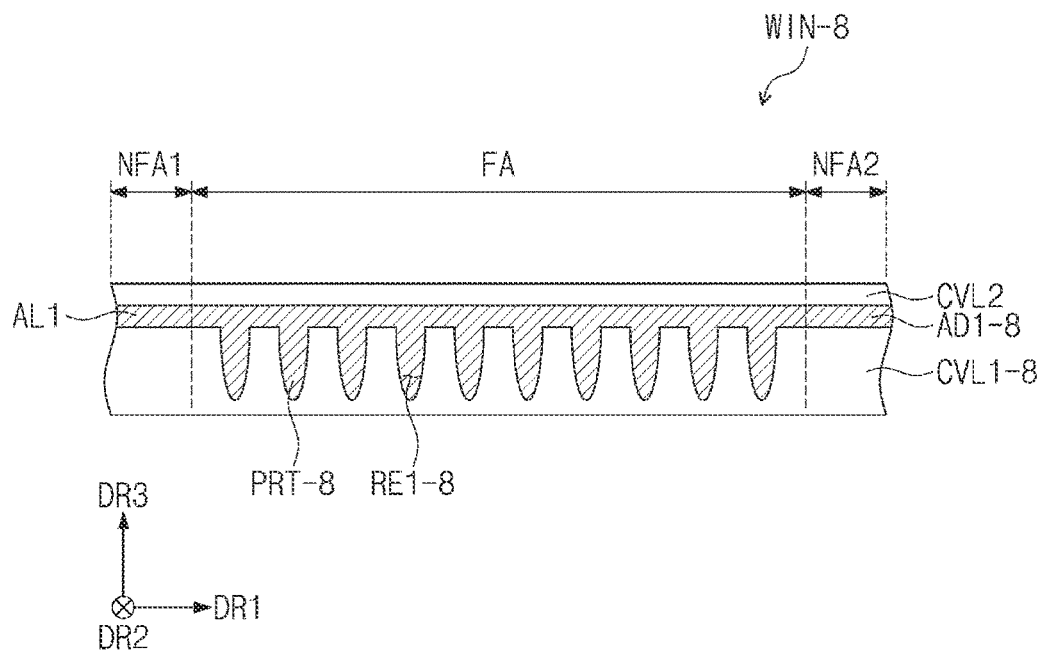

FIGS. 12 and 13 are schematic cross-sectional views illustratively showing windows according to an embodiment.

The shapes of first recessed portions RE1-7 and RE1-8 of windows WIN-7 and WIN-8 may be diversely modified. Referring to FIG. 12, when viewed in a second direction DR2, a first recess RE1-7 may have a substantially "V" shape. In this case, a protrusion PRT-7 to be disposed in the first recess RE1-7 may be modified into substantially the same shape. In FIG. 12, a first adhesive layer or part AL1-7 may be in contact with the first top surface of the first cover layer CVL1-7 and a bottom surface of the second cover layer CVL2.

Referring to FIG. 13, when viewed in a second direction DR2, a first recess RE1-8 may have a substantially "U" shape. In this case, a protrusion PRT-8 to be disposed in the first recess RE1-8 may be modified into substantially the same shape. In FIG. 13, a first adhesive layer or part AL1-8 may be in contact with the first top surface of the first cover layer CVL1-8 and a bottom surface of the second cover layer CVL2.

According to an embodiment, the plurality of first recessed portions extending parallel to the folding axis may be defined or formed in the folding area of the first cover layer, and thus, the window may have high flexibility. Accordingly, the display device may be easily folded and unfolded.

Although embodiments have been described, it is understood that various changes and modifications can be made by one of ordinary skill in the art within the spirit and scope of the disclosure as hereinafter claimed. Also, embodiments are not intended to limit the disclosure, and all equivalents should be interpreted to be included in the scope of the disclosure.

What is claimed is:

1. A window comprising:
    a first cover layer comprising a first non-folding area and a second non-folding area spaced apart in a first direction, and a folding area disposed between the first non-folding area and the second non-folding area and in which a plurality of first recessed portions at least partially removed from an upper surface is defined;
    a second cover layer disposed on the first cover layer; and
    a first adhesive part disposed between the first cover layer and the second cover layer and comprising a plurality of protrusions disposed in the corresponding first recessed portions,
    wherein each of the plurality of first recessed portions extends along a second direction intersecting the first direction and is spaced apart from each other along the first direction.

2. The window of claim 1, wherein in a thickness direction of the first cover layer, a depth of the plurality of first recessed portions is the same as a thickness of the plurality of protrusions.

3. The window of claim 1, wherein in a plan view, each of the plurality of protrusions is parallel to the adjacent first recessed portions along the second direction.

4. The window of claim 1, wherein each of the plurality of first recessed portions is defined by:
    a first inner surface of the first cover layer;
    a second inner surface facing the first inner surface of the first cover layer; and
    a bottom surface disposed between the first inner surface and the second inner surface of the first cover layer,
    wherein the bottom surface is parallel to the top surface of the first cover layer.

5. The window of claim 1, wherein a distance between adjacent the first recessed portions in the first direction is equal to each other.

6. The window of claim 1, wherein the second cover layer has a smaller thickness than the first cover layer.

7. The window of claim 1, wherein in a thickness direction of the first cover layer, a depths of the plurality of first recessed portions decrease gradually in the direction from the center of the folding area toward the first non-folding area and the second non-folding area.

8. The window of claim 1, wherein in a thickness direction of the first cover layer, a depths of the plurality of first recessed portions increase gradually in the direction from the center of the folding area toward the first non-folding area and the second non-folding area.

9. The window of claim 1, wherein the first cover layer is defined with a plurality of second recessed portions which is removed from a portion of a bottom surface of the first cover layer overlapping the folding region.

10. The window of claim 9, wherein the plurality of first recessed portions and the plurality of second recessed portions are alternately arranged along the first direction.

11. The window of claim 10, further comprising a plurality of second adhesive parts inserted into the corresponding second recessed portions, and
    an one surface of each of the second adhesive parts exposed from the corresponding second recessed portions defines the same plane as the bottom surface of the first cover layer.

12. The window of claim 1, wherein an one surface of each of the plurality of protrusions exposed from the corresponding first recessed portions defines a same plane as a bottom surface of the first cover layer.

13. The window of claim 12, further comprising a second adhesive part disposed on the bottom surface of the first cover layer,
    wherein in the folding area, the second adhesive part contacts the one surface of each of the plurality of protrusions.

14. The window of claim 13, further comprising a third cover layer disposed below the second adhesive part,
    wherein the third cover layer and the second cover layer comprise a same material.

15. The window device of claim 1, wherein a width of each of the plurality of first recessed portions in the first direction decreases away from the first adhesive part.

16. The window device of claim 15, wherein a shape of each of the plurality of first recessed portions has a "V" shape or a "U" shape in the second direction.

17. The window of claim 1, wherein a thickness of the second cover layer is smaller than a thickness of the first cover layer.

18. The window of claim 1, wherein the folding area is folded based on a folding axis extending in the second direction.

19. A window comprising:
    a first cover layer comprising a first non-folding area and a second non-folding area spaced apart in a first direction, and a folding area disposed between the first non-folding area and the second non-folding area and in which a plurality of first recessed portions at least partially removed from an upper surface is defined;
    a second cover layer disposed on the first cover layer; and
    a first adhesive part disposed between the first cover layer and the second cover layer and comprising a plurality of protrusions disposed in the corresponding first recessed portions,
    wherein each of the plurality of first recessed portions is spaced apart from each other in the first direction and in a second direction crossing the first direction.

20. The window of claim 19, wherein in a thickness direction of the first cover layer, a depth of the plurality of first recessed portions is the same as a thickness of the plurality of protrusions.

* * * * *